United States Patent [19]
Doerr

[11] 3,899,056
[45] Aug. 12, 1975

[54] HYDRAULIC BICYCLE BRAKE ASSEMBLY

[76] Inventor: Carl L. Doerr, 2850 Ladoga, Long Beach, Calif. 90815

[22] Filed: Apr. 30, 1973

[21] Appl. No.: 355,555

[52] U.S. Cl. ............................................. 188/344
[51] Int. Cl. ........................................... B60t 11/16
[58] Field of Search .................... 188/344; 74/551.9

[56] References Cited
UNITED STATES PATENTS

| | | | |
|---|---|---|---|
| 610,796 | 9/1898 | Bowman | 188/344 |
| 869,948 | 11/1907 | Turner | 188/344 |
| 3,295,636 | 1/1967 | Adams | 188/76 X |
| 3,434,570 | 3/1969 | Freholm | 188/72.6 X |
| 3,465,849 | 9/1969 | Bernfeld et al. | 188/72.6 X |
| 3,554,334 | 1/1971 | Shimano | 188/344 |
| 3,713,350 | 1/1973 | Brilando | 74/551.9 |

FOREIGN PATENTS OR APPLICATIONS

| | | | |
|---|---|---|---|
| 22,939 | 9/1902 | United Kingdom | 188/344 |
| 783,659 | 4/1935 | France | 188/344 |
| 1,239,805 | 7/1971 | United Kingdom | 188/344 |
| 388,807 | 6/1908 | France | 188/344 |

*Primary Examiner*—George E. A. Halvosa
*Attorney, Agent, or Firm*—William C. Babcock

[57] ABSTRACT

A hydraulic bicycle brake assembly that includes a pair of arms that support a pair of brake pads on first ends thereof, with the arms being pivotally supported from a bicycle in such a position that the pads may be brought into frictional braking contact with a portion of a rotating wheel of the bicycle when second ends of the arms are moved transversely relative to one another. Movement of the second arms to dispose the brake pads in a braking position is accomplished by the rider of the bicycle decreasing the volume of a hollow body that holds a quantity of hydraulic fluid. The hydraulic fluid is discharged therefrom by a flexible tubular conductor to a hydraulic cylinder that occupies a fixed position relative to a bicycle.

A piston and piston rod are slidably movable on the cylinder and as fluid is discharged into the cylinder the piston and piston rod are moved in a direction to so pivot the arms that the brake pads are forced into pressure friction contact with a portion of a rotating wheel of the bicycle. By the use of a hydraulic fluid in the above described manner, the pads can be forced into greater frictional pressure contact with a rotating portion of the wheel than is possible by conventional mechanical means now in use, and the bicycle can accordingly be brought to a quicker stop than is now possible.

3 Claims, 17 Drawing Figures

PATENTED AUG 12 1975

3,899,056

SHEET 1

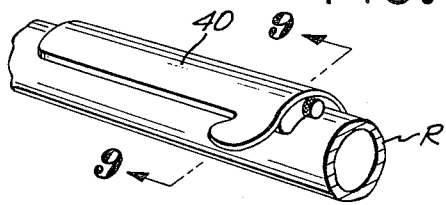
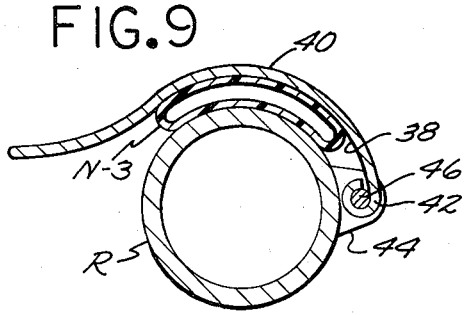
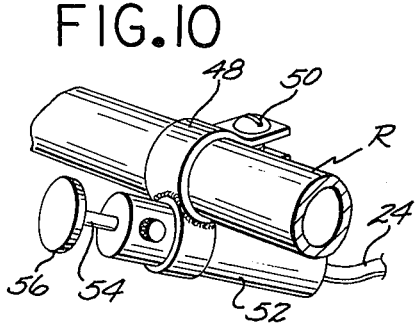
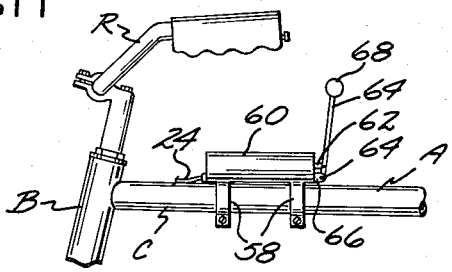
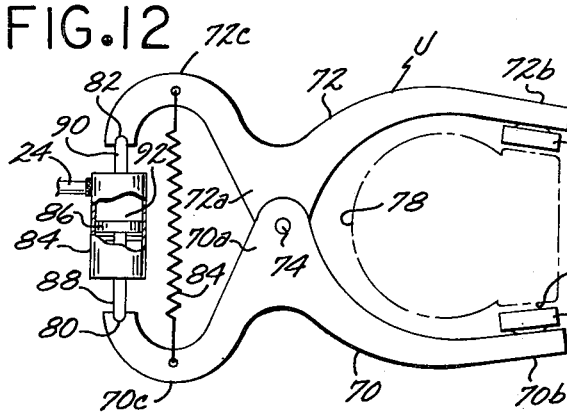
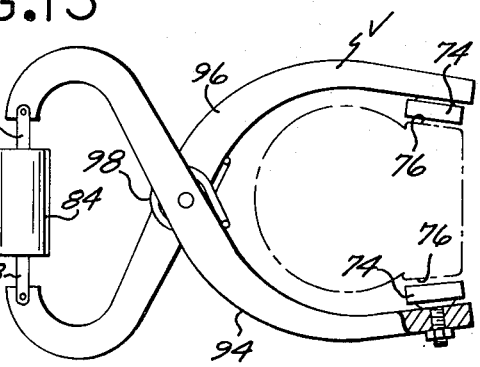
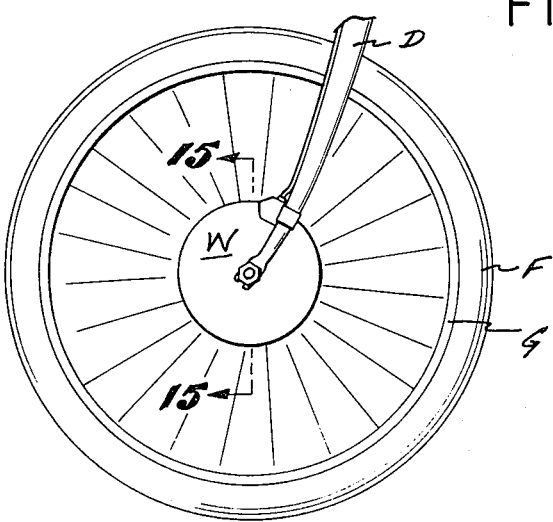
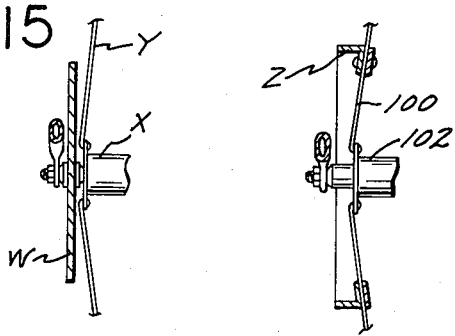
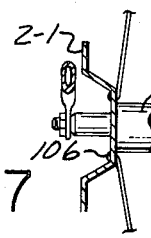

3,899,056

HYDRAULIC BICYCLE BRAKE ASSEMBLY

BACKGROUND OF THE INVENTION

1. Field of the Invention

Hydraulic bicycle brake assembly.

2. Description of the Prior Art

In recent years, bicycles that have a braking assembly in which a pair of pivotally supported arms force a pair of brake pads into pressure frictional contact with opposite sides of a wheel portion of a bicycle have increased in popularity, and particularly on ten speed type of bicycles. The pivoting of the arms above described has in the past been by mechanical means, but such means only permit the arms to be pivoted with a limited force, and as a result the brake pads do not apply sufficient braking pressure to the rotating portion of the wheel with which they are associated to bring the bicycle to a quick stop in an emergency situation.

The primary purpose of devising the present invention is to utilize hydraulic fluid pressure means for actuating the brake pads to a degree that the bicycle may be stopped in a lesser distance than in possible with conventional braking equipment now in use.

SUMMARY OF THE INVENTION

A hydraulic operated bicycle brake assembly that includes a pair of arms pivotally supported from a bicycle in such a position that brake pads mounted on first ends of the arms may be brought into frictional braking contact with a rotating portion of a bicycle wheel when desired by the rider of the bicycle. The second ends of the arms are moved by a hydraulic fluid power assembly that is actuated by a rider of the vehicle decreasing the volume on a hollow body supported at a convenient position relative to the handle bars, and this decrease in volume forcing hydraulic fluid into the assembly to pivot the arms and move the pads into braking contact with the rotating portion of the wheel.

The primary purpose in devising the present invention is to permit the pads to be moved into frictional pressure contact with a rotating portion of the wheel with a greater force than is possible by conventional mechanical means now employed for this purpose, and due to this greater pressure contact the bicycle may be brought to a stop in a shorter distance than is possible by conventional means now in use.

A BRIEF DESCRIPTION OF THE DRAWINGS

FIG. 8 is a fourth alternate form of hydraulic fluid actuated device;

FIG. 9 is a transverse cross sectional view of the fourth alternate form taken on the line 9—9 thereof;

FIG. 10 is a fifth alternate form of hydraulic fluid actuating device;

FIG. 11 is a side elevational view of a sixth alternate form of hydraulic fluid actuating device;

FIG. 12 is a first alternate form of pivoted arms structure, by which the brake pads may be brought into pressure frictional contact with a rotating portion of a bicycle wheel;

FIG. 13 is a front elevational view of a second alternate form of pivoted arm structure, hydraulic cylinder, and pressure applying brake pads;

FIG. 14 is a side elevational view of a bicycle frame and rotatably supported wheel with the wheel includes a disk that may be selectively engaged by a pair of hydraulic actuated brake pads;

FIG. 15 is a fragmentary cross sectional view of the device shown in FIG. 14 taken on the line 15—15 thereof;

FIG. 16 is a first alternate form of wheel supported brake drum; and

FIG. 17 is a fragmentary cross sectional view of a second alternate form of brake drum that is rigidly secured to the wheel of the bicycle.

DESCRIPTION OF THE PREFERRED EMBODIMENT

Figures 1, 2, 3, 4, 5, 6, 7:
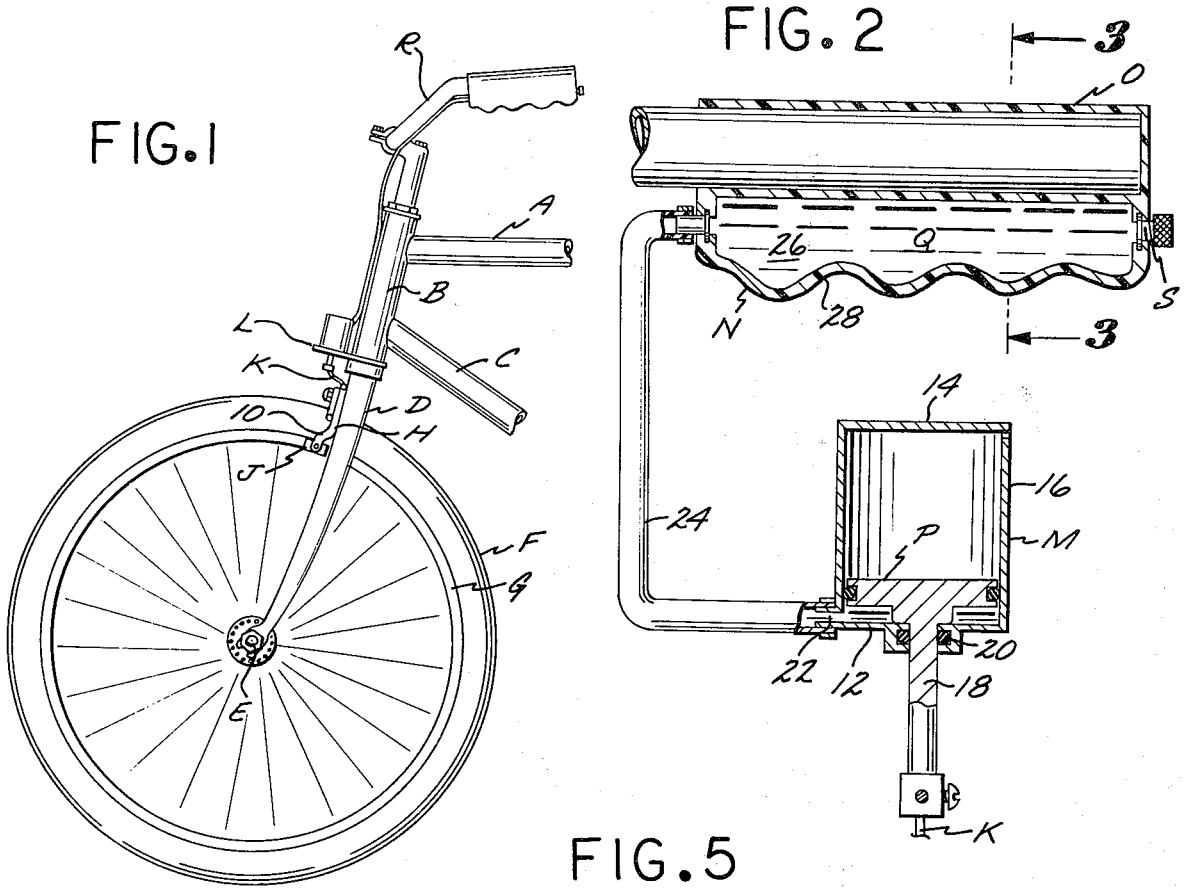
FIG. 1 is a side elevational view of a forward portion of a bicycle equipped with a first form of the hydraulic bicycle brake assembly.
FIG. 2 is a combined vertical cross sectional view and a front elevational view of the hydraulic fluid actuated portion of the assembly shown in FIG. 1.
FIG. 3 is a transverse cross sectional view of a portion of the device shown in FIG. 2 taken along the line 3—3 thereof.
FIG. 4 is a first alternate form of the device shown in FIG. 3.
FIG. 5 is a second alternate form of the device for applying pressure to hydraulic fluid to actuate the brake assembly.
FIG. 6 is a transverse cross sectional view of the second alternate form taken on the line 6—6 of FIG. 5.
FIG. 7 is a third alternate form of two hydraulic fluid actuated device disposed in series and mounted on the handle bar of the bicycle.

A bicycle A is shown in FIG. 1 that includes an upwardly and rearwardly extending tubular portion B that forms a part of a frame C as is conventional in bicycle construction. The tubular portion B pivotally supports a fork D therebelow. The fork D on the lower extremity thereof supports a rigid shaft E in a transverse horizontal portion, and on which shaft a spoked pneumatic tired wheel F is illustrated. The wheel F includes a circumferentially extending rim G. A conventional bicycle brake assembly H is mounted on the forked portion D and includes two pivotally connected arms 10 that support brake pads J on the lower extremity thereof.

When the arms 10 are pivoted in an appropriate direction, the brake pads J are forced into pressure contact with the rim G to brake the bicycle. Movement of the arms H to place the pads J in a braking position is accomplished by upward movement of an actuator K, which prior to the present invention has been accomplished by mechanical means.

In the form of the invention shown in FIG. 1 a support L is secured to tubular portion B, has a hydraulic cylinder M as best seen in FIG. 1 mounted thereon. Cylinder M has a first end 12, second end 14 and a side wall 16 extending therebetween. The first end 12 has a piston rod 18 slidably mounted therein, with sealing means 20 in the form of an o-ring or the like at all times being in contact with the piston rod 18. A hydraulic fluid passage 22 is formed in the side wall 16 adjacent the first end 12 and the passage by conventional means being connected to the interior of the tubular member 24 that extends upwardly. Tubular member 24 has an open end thereof in communication with the interior confined space 26 of an elongate deformable body N that is preferably formed from a resilient material such as plastic, rubber or the like. The body N includes a tubular portion O that may be slid over an end portion of the handle bar R of the bicycle A as shown in FIG. 2, with the body N and tubular portion O replacing the grip (not shown) that is normally positioned on the bicycle. The piston rod 18 has a first end thereof connected to a piston P that is slidably movable in cylinder M. The interior 26 of the body N as well as the conduit 24 is filled with hydraulic fluid Q. The body N has a number of transverse longitudinally spaced grooves 28 formed therein that may be engaged by the fingers of the user (not shown). When the fingers of the user apply pressure to the body N, the confined space 26 therein is filled with hydraulic fluid Q is decreased in volume, with the fluid being discharged through the conduit 24 to force the piston P and actuator K upwardly to pivot the arms H in a direction in which the brake pads J are forced into pressure braking contact with the rim G.

The arms H are spring loaded as is normal on this type of brake and tend to at all times occupy a first position in which the pads J are not in pressure contact with the rim G. Upon pressure being released from the body N, the body N expands to the position shown in FIG. 2 and hydraulic fluid is withdrawn from the cylinder M to permit the piston P and piston rod 18 to be moved downwardly to a position shown in FIG. 2 as the spring loading on the arms H returns the arms to a first position when the pads J are not in contact with the rim G.

A first alternate form of a hydraulic fluid holding body N-1 is shown in FIG. 4 that is identical to the body N previously described other than that the body N-1 has two longitudinally extending creases 30 molded or otherwise formed therein to permit the rider of the bicycle to deform the body N-1 to decrease the volume 26 of the confined space therein with a minimum of force. A second alternate form N-2 is shown in FIG. 5 which includes an elongate resilient body 32 that defines the confined space 26, and is secured to the handle bar R by a clip 34. The body N, N-1 and N-2 preferably includes a filler and bleeder cap assembly S of conventional design as shown in FIGS. 2, 5 and 7. In FIG. 7 the handle bar R is shown as supporting a resilient body N as previously described, as well as a body N-2, that are connected in series at their adjacent ends by a resilient tube 36, and the body N-2 being connected to the hydraulic cylinder M by a tubular member 38. In the arrangement shown in FIG. 7 either one or both of the bodies N and N-2 may be deformed by pressure applied thereto by the fingers of the user (not shown) to discharge hydraulic fluid to the cylinder M to pivot the arms H and move the brake pads J into pressure contact with the rim G.

A third alternate form N-3 of a deformable body is shown in FIGS. 8 and 9 with the body N-3 being sandwiched between the exterior surface of the handle bar R and the interior surface 38 of a rigid arm 40, which arm has a first end portion 42 thereof pivotally secured to a bracket 44 that extends outwardly from the handle bar. The end portion 42 is pivotally connected to the bracket 44 by a pin 46 or other conventional means.

The handle bar R as illustrated in FIG. 10 as having a clamp 48 removably secured thereto by a screw, bolt or other fastening means 50, and the clamp supporting a hydraulic cylinder 52 in which a piston (not shown) is mounted that is moved longitudinally therein by a piston rod 54 that has a handle 56 on the free end thereof. The hydraulic fluid from the cylinder 52 discharges through the tubular member 24 to actuate the piston P of the cylinder M as previously described.

In FIG. 11 the frame C of the bicycle A is engaged by a pair of clamps 58 of conventional description that support a hydraulic cylinder 60 in which a piston (not shown) is movable by a piston rod 62. The piston rod 62 is pivotally connected to a lever 64, which lever is by a pin 64 supported from a bracket 66 that extends outwardly and rearwardly from the cylinder 60. The free end of the lever 64 supports a handle 68. By pivotal movement of the lever 64 the piston rod 62 is moved longitudinally relative to the cylinder 60 to discharge fluid therefrom through tubular member 24 to the cylinder M as previously described to move the pressure pads J into pressure contact with the rim G.

A first elongate form of brake assembly U is shown in FIG. 12 that includes first and second arms 70 and 72 that include inwardly extending portions 70a and 72a that are pivotally connected to one another by a pin 74. The arms 70 and 72 include first ends 70b and 72b that support a pair of brake pads 74 that may be brought into pressure contact with the rim 76 that supports a pneumatic tire 78, which rim and tire are shown in phantom line. The arms 70 and 72 include second ends 70c and 72c that are of substantial thickness and have sockets 80 and 82 formed therein. A tensioned spring 84 extends between the second arm end portions 70c and 72c and at all times tends to move the second end portions towards one another to maintain the pressure pads 74 out of contact with the rim 76.

A hydraulic cylinder 84 is provided that is in communication with the tube 24, with the cylinder having a piston 86 mounted therein from which a piston rod 88 extends outwardly through a first end of the cylinder to engage the first socket 80. A prong 90 extends outwardly from the second end of the cylinder 84 and removably engages the socket 82. When hydraulic fluid Q is discharged into the confined space 92 in cylinder 84, the piston 86 and piston rod 88 and so moved relative to cylinder 84 that the second ends 70c and 72c of the arms 70 and 72 are moved away from one another, and the pads 74 are brought into pressure braking contact with rim 76.

A second alternate form V of the brake assembly is shown in FIG. 13 that is similar to that shown in FIG. 12. In the second alternate form V, two arms 94 and 96 are provided that are of compound curved configuration, with first ends thereof supporting brake pads 76, and second ends thereof being pivotally engaged by the piston rod 88 and prong 90 as described in the form U of the brake assembly. A clip type spring 98 engages the first and second arms 94 and 96 as shown in FIG. 13, and serves to maintain the brake pads 74 out of contact with the rim 76 except when fluid is discharged through the tubular member 24 to the cylinder 84.

In FIGS. 14 and 15 a disk W is shown that is secured to the hub X of a wheel Y, and the disk being engagable by any one of the brake assemblies as previously described in lieu of the brake assembly engaging the rim of a wheel. FIG. 16 illustrates a cylindrical shell Z that may be secured to the spokes 100 of a wheel 102, and the shell being engagable by pressure pads 74 by use of one of the brake assemblies previously described. Another form of drum Z-1 is shown in FIG. 17 that is also securable to a portion of a wheel 104 by bolts 106 or other conventional fastening means, and the drum Z-1 being pressure engagable by pads 74 by any one of the brake assemblies previously described. The use and operation of the invention has previously been described in detail and need not be repeated.

I claim:

1. In combination with a bicycle having a handle bar and a brake assembly of the type in which a pair of pivotally connected arms having first and second ends are transversely positioned relative to a wheel of said bicycle, said arms supporting a pair of brake pads on said first ends thereof that are brought into frictional pressure contact with a rotating portion of said wheel when said arms are pivoted from a first to a second position; hydraulically operated, spring loaded means that are operatively associated with said second ends of said arms to move the latter from said first towards said second position when a quantity of hydraulic fluid in said spring loaded means has additional hydraulic fluid added thereto; a tube that is at all times in communication with said hydraulic fluid in said spring loaded means, with said brake assembly being characterized by including:

a. at least one resilient pressure-deformable elongate hollow body formed from an elastomeric material that defines a confined space in communication with said tube, said body longitudinally and adjacently disposed relative to said handle bar, and said tube and confined space filled with hydraulic fluid, and said body having a longitudinal cavity therein that slidably engages an end portion of said handle bar to support said hollow body thereon, with said body serving the dual function of acting as a grip to be grasped by a hand of a user in guiding said bicycle with said handle bar and as a means for discharging additional hydraulic fluid under pressure to said spring loaded means when the confined space in said hollow body is decreased by said user transversely deforming said hollow body by gripping the same with increased pressure by said hand in contact therewith.

2. The brake assembly as defined in claim 1 in which said hollow body is elongate in shape and has a plurality of longitudinally spaced transversely extending grooves therein that may be engaged by the fingers of a user to deform said body.

3. The device as defined in claim 1 in which said hollow body has a pair of oppositely disposed longitudinal grooves therein to permit deformation of said body with a minimum of effort when pressure is applied thereto by the fingers of said hand of said user.

* * * * *